United States Patent
Tsai et al.

(10) Patent No.: US 11,785,917 B2
(45) Date of Patent: Oct. 17, 2023

(54) FEEDER

(71) Applicant: Chicony Electronics Co., Ltd., New Taipei (TW)

(72) Inventors: Pei-Sheng Tsai, New Taipei (TW); Wen-Lung Chen, New Taipei (TW)

(73) Assignee: Chicony Electronics Co., Ltd., New Taipei (TW)

( * ) Notice: Subject to any disclaimer, the term of this patent is extended or adjusted under 35 U.S.C. 154(b) by 486 days.

(21) Appl. No.: 17/179,434

(22) Filed: Feb. 19, 2021

(65) Prior Publication Data

US 2021/0400909 A1 Dec. 30, 2021

(30) Foreign Application Priority Data

Jun. 30, 2020 (TW) ................... 109122150

(51) Int. Cl.
*A01K 5/02* (2006.01)
*F16H 19/00* (2006.01)

(52) U.S. Cl.
CPC ......... *A01K 5/0275* (2013.01); *F16H 19/001* (2013.01)

(58) Field of Classification Search
CPC ............................. A01K 15/0275; F16H 27/08
USPC .......................................................... 74/437
See application file for complete search history.

(56) References Cited

U.S. PATENT DOCUMENTS

| | | | | |
|---|---|---|---|---|
| 8,336,492 B1 * | 12/2012 | Barley | ................... | A01K 61/80 119/51.04 |
| 8,347,817 B1 * | 1/2013 | Miller | ................... | A01K 5/0291 119/57.91 |
| 10,912,279 B2 * | 2/2021 | Chen | ................... | A01K 5/0275 |
| 2006/0219187 A1 * | 10/2006 | Krishnamurthy | .... | A01K 5/0275 119/719 |
| 2014/0103148 A1 | 4/2014 | Wisecarver | | |
| 2015/0128875 A1 * | 5/2015 | Christianson | ........ | A01K 5/0275 119/707 |
| 2017/0069156 A1 * | 3/2017 | Abe | ......................... | G07D 9/04 |
| 2018/0295807 A1 * | 10/2018 | Hsu | ...................... | A01K 15/021 |
| 2019/0133075 A1 * | 5/2019 | Holovin | ................... | A01K 5/02 |
| 2021/0235664 A1 * | 8/2021 | Wolfe, Jr. | ............... | A01K 5/025 |

FOREIGN PATENT DOCUMENTS

| | | |
|---|---|---|
| CN | 110905222 A | 3/2020 |
| CN | 210328907 U | 4/2020 |

* cited by examiner

*Primary Examiner* — Monica L Perry
*Assistant Examiner* — Edgar Reyes
(74) *Attorney, Agent, or Firm* — CKC & Partners Co., LLC

(57) ABSTRACT

A feeder includes a housing, an ejection structure, and a driving module. The housing includes a discharge channel. The discharge channel has an accommodating space and a discharge port communicated with each other. The ejection structure includes an ejection blade. The ejection blade is rotatably disposed in the accommodating space. The driving module is configured to rotate the ejection structure, so that the ejection blade ejects the feed located in the accommodating space away from the discharge port. The driving module includes a position-returning member configured to maintain the ejection structure in a first rotational orientation relative to the housing. The driving module is further configured to rotate the ejection structure relative to the housing to exceed a second rotational orientation and then release the ejection structure.

15 Claims, 7 Drawing Sheets

FEEDER

CROSS-REFERENCE TO RELATED APPLICATION

This application claims priority to Taiwan Application Serial Number 109122150, filed Jun. 30, 2020, which is herein incorporated by reference.

BACKGROUND

Technical Field

The present disclosure relates to a feeder, and more particularly, to a feed feeder.

Description of Related Art

Taking a commercially available pet feeding machine as an example, the feeding and discharging method of feed is to first hold the feed in a hopper, then push the feed to an ejection area connected with the hopper with a push rod, and then use an ejection rod to eject the feed from the ejection area out of the machine for pets to eat.

However, the above method has at least the following disadvantages: (1) it is impossible to control the amount of feed that the push rod pushes to the ejection area each time, so that the amount of feed ejected each time will be quite different; and (2) there will be a loud impact sound when the ejection rod is actuated to eject the feed.

Accordingly, how to provide a feeder to solve the aforementioned problems becomes an important issue to be solved by those in the industry.

SUMMARY

An aspect of the disclosure is to provide a feeder that can efficiently solve the aforementioned problems.

According to an embodiment of the disclosure, a feeder includes a housing, an ejection structure, and a driving module. The housing includes a discharge channel. The discharge channel has an accommodating space and a discharge port communicated with each other. The ejection structure includes an ejection blade. The ejection blade is rotatably disposed in the accommodating space. The driving module is configured to rotate the ejection structure, so that the ejection blade ejects the feed located in the accommodating space away from the discharge port. The driving module includes a position-returning member configured to maintain the ejection structure in a first rotational orientation relative to the housing. The driving module is further configured to rotate the ejection structure relative to the housing to exceed a second rotational orientation and then release the ejection structure.

In an embodiment of the disclosure, the driving module further includes a driven gear and a driving gear. The driven gear is coupled to the ejection structure. The driving gear has a first driving tooth portion and a first toothless portion arranged in a ring. The first driving tooth portion is configured to mesh with the driven gear.

In an embodiment of the disclosure, the driven gear has a driven tooth portion and a driven toothless portion arranged in a ring. The driven tooth portion is configured to mesh with the first driving tooth portion.

In an embodiment of the disclosure, the driving gear further has a plurality of the first driving tooth portions and a plurality of the first toothless portions. The first driving tooth portions and the first toothless portions are alternately arranged.

In an embodiment of the disclosure, the position-returning member is a torsion spring or a tension spring.

In an embodiment of the disclosure, two ends of the torsion spring are respectively coupled to the discharge channel and the ejection structure.

In an embodiment of the disclosure, the ejection structure rotates 180 degrees while rotating from the first rotational orientation to the second rotational orientation.

In an embodiment of the disclosure, the housing further includes a hopper. A bottom of the hopper has a communication port connected to the discharge channel. The feeder further includes a screening tray. The screening tray is rotatably disposed in the hopper and has a plurality of partition grooves arranged in a ring. The partition grooves are aligned with the communication port in sequence as the screening tray rotates. The driving module is further configured to rotate the screening tray.

In an embodiment of the disclosure, the driving module includes a driving gear and a transmission mechanism. The driving gear rotates the screening tray through the transmission mechanism.

In an embodiment of the disclosure, the transmission mechanism includes a transmission gear. The driving gear has a second driving tooth portion and a second toothless portion arranged in a ring. The second driving tooth portion is configured to mesh with the transmission gear.

In an embodiment of the disclosure, an outer edge of the screening tray has a driven tooth portion arranged in a ring. The transmission mechanism includes a transmission gear. The transmission gear meshes with the driven tooth portion.

In an embodiment of the disclosure, the feeder further includes a cover plate and a stirring tray. The cover plate covers the screening tray in the hopper and has a notch. The notch is configured to expose one of the partition grooves. The stirring tray is rotatably disposed in the hopper and located over the cover plate.

In an embodiment of the disclosure, the housing further includes a connection shaft located in the hopper and located at the bottom of the hopper. The screening tray and the stirring tray are rotatably sleeved onto the connection shaft. The cover plate is engaged with the connection shaft.

In an embodiment of the disclosure, the connection shaft includes a circular shaft section and a cut shaft section connected to each other. The circular shaft section is connected between the bottom of the hopper and the cut shaft section. The screening tray is rotatably sleeved onto the circular shaft section. The cover plate is engaged with the cut shaft section. The stirring tray is rotatably sleeved onto the cut shaft section.

In an embodiment of the disclosure, the screening tray has a first engaging structure. The stirring tray has a second engaging structure. The first engaging structure and the second engaging structure are engaged with each other and located outside an outer edge of the cover plate.

In an embodiment of the disclosure, while rotating one of the ejection structure and the screening tray, the driving module stops rotating another of the ejection structure and the screening tray.

Accordingly, in the feeder of the present disclosure, the ejection structure uses the ejection blade to eject the feed away from the discharge port in a rotating manner, so it can effectively avoid noise when ejecting the feed. In addition, the hopper of the feeder is further provided with a screening tray with a plurality of partition grooves, so the feed put in the hopper can be grouped and screened into the partition grooves. Furthermore, a rotatable stirring tray is further provided above the screening tray, so the problem of uneven accumulation of feed in the hopper at one side of the hopper can be effectively solved. Therefore, the amount of feed entering each compartment from the stirring tray through the notch of the cover plate can be more consistent, thereby effectively solving the problem of uneven feed entering the discharge channel each time.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
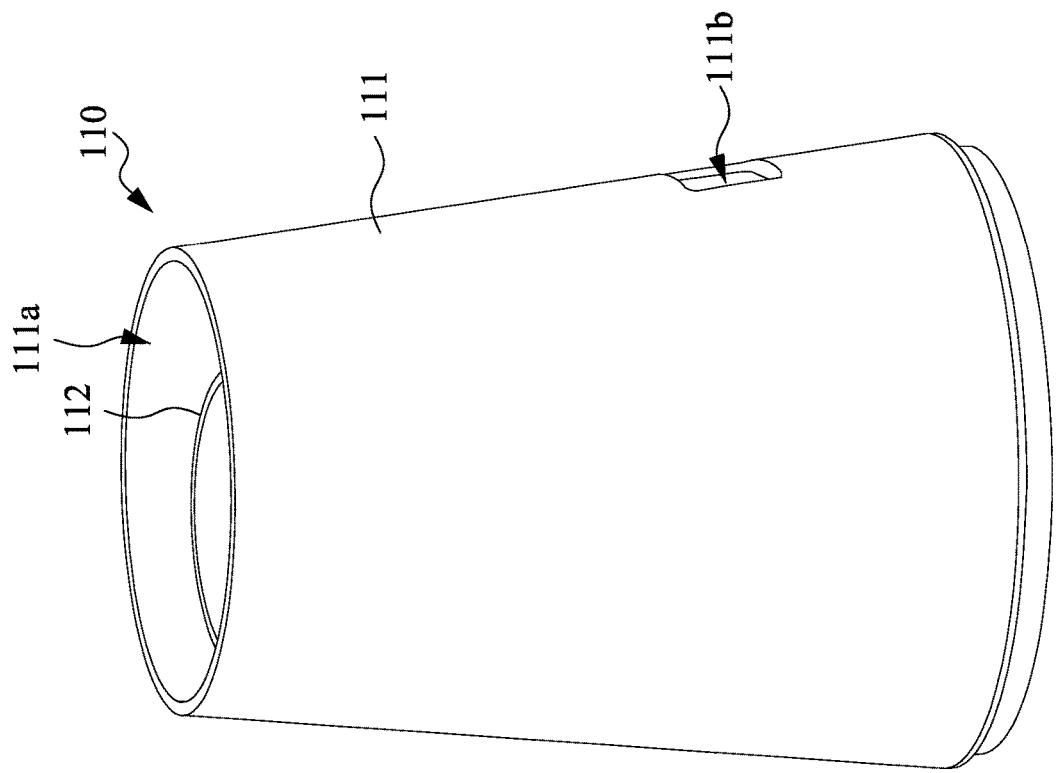
FIG. 1 is a perspective view of a feeder according to an embodiment of the disclosure.

Reference will now be made in detail to the present embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

Figure 2:
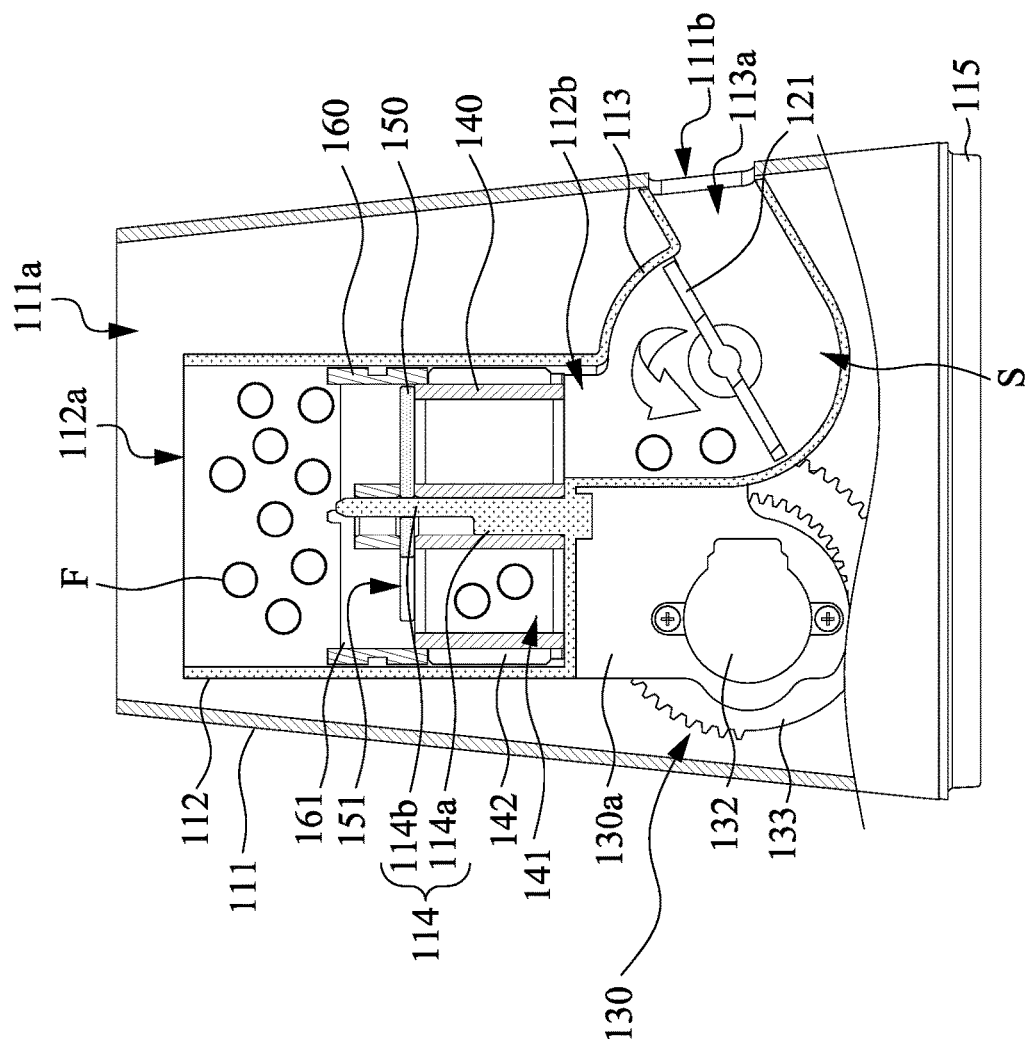
FIG. 2 is a partial cross-sectional view of the feeder shown in FIG. 1.
Figure 3:
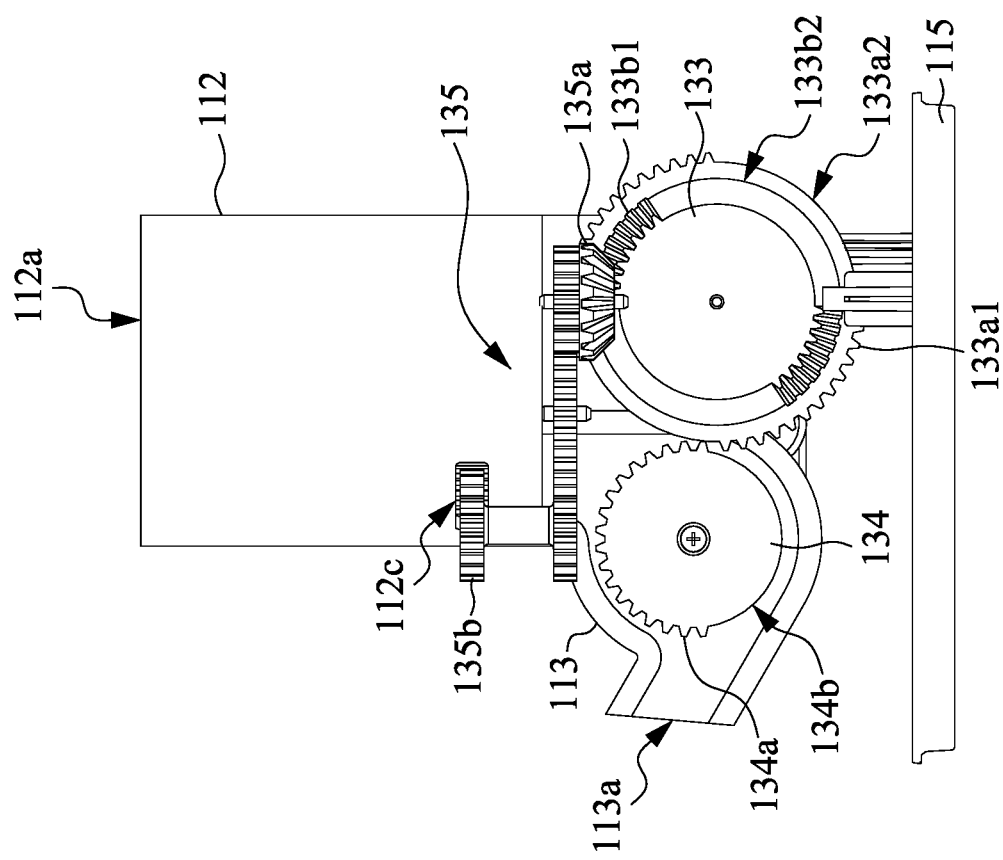
FIG. 3 is a side view of the feeder according to an embodiment of the present disclosure with an outer cover removed.
Figure 4:
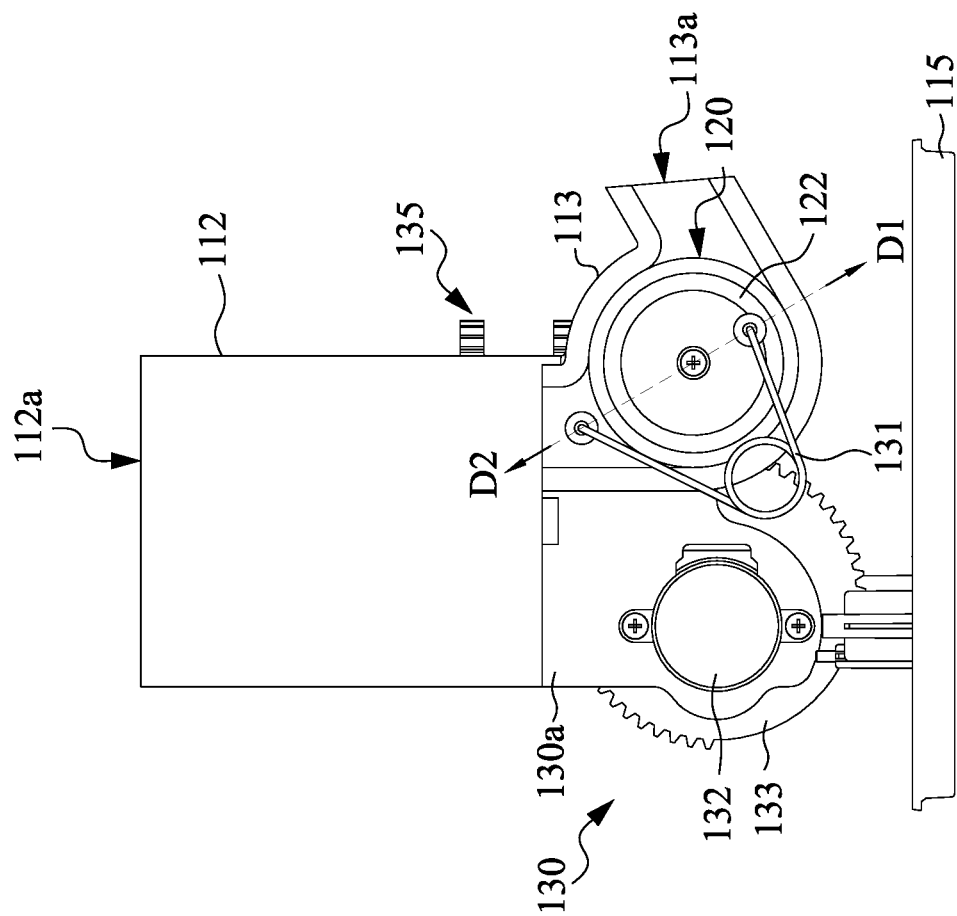
FIG. 4 is another partial side view of the components in FIG. 3.

Reference is made to FIGS. 1 to 4. FIG. 1 is a perspective view of a feeder 100 according to an embodiment of the disclosure. FIG. 2 is a partial cross-sectional view of the feeder 100 shown in FIG. 1. FIG. 3 is a side view of the feeder 100 according to an embodiment of the present disclosure with an outer cover 111 removed. FIG. 4 is another partial side view of the components in FIG. 3. In the present embodiment, the feeder 100 includes a housing 110, an ejection structure 120, and a driving module 130. The housing 110 includes an outer cover 111, a hopper 112, and a discharge channel 113. As shown in FIG. 1, the outer cover 111 has an upper opening 111a, a side opening 111b, and an internal space communicated between the upper opening 111a and the side opening 111b. As shown in FIG. 2, the hopper 112 and the discharge channel 113 are located in the internal space of the outer cover 111 and connected to each other. The hopper 112 has an inlet port 112a. The inlet port 112a faces the upper opening 111a of the outer cover 111. The discharge channel 113 has an accommodating space S and a discharge port 113a communicated with each other. The discharge port 113a is connected to the side opening 111b of the outer cover 111. The bottom of the hopper 112 has a communication port 112b communicated with the accommodating space S of the discharge channel 113. It can be seen that feed F can leave the feeder 100 from the side opening 111b of the outer cover 111 sequentially through the upper opening 111a of the outer cover 111, the hopper 112, the communication port 112b, the accommodating space S of the discharge channel 113, and the discharge port 113a.

As shown in FIG. 2, the ejection structure 120 includes ejection blades 121. The ejection blades 121 are rotatably disposed in the accommodating space S. The driving module 130 and the ejection structure 120 are substantially located below the hopper 112. The driving module 130 is configured to rotate the ejection structure 120, so that the ejection blades 121 eject the feed F away from the discharge port 113a. The structures and functions of the components included in the feeder 100 and the connection and operation relationships among these components will be described in detail below.

In some embodiments, as shown in FIG. 2, the discharge port 113a is designed to extend diagonally upward relative to the accommodating space S. Specifically, the extension direction of the discharge port 113a of the discharge channel 113 is inclined at an angle (e.g., 30 degrees, 45 degrees, or 60 degrees) relative to a bottom surface of a base 115 of the housing 110 to facilitate the ejection structure 120 to eject the feed F out of the feeder 100.

Figure 5:
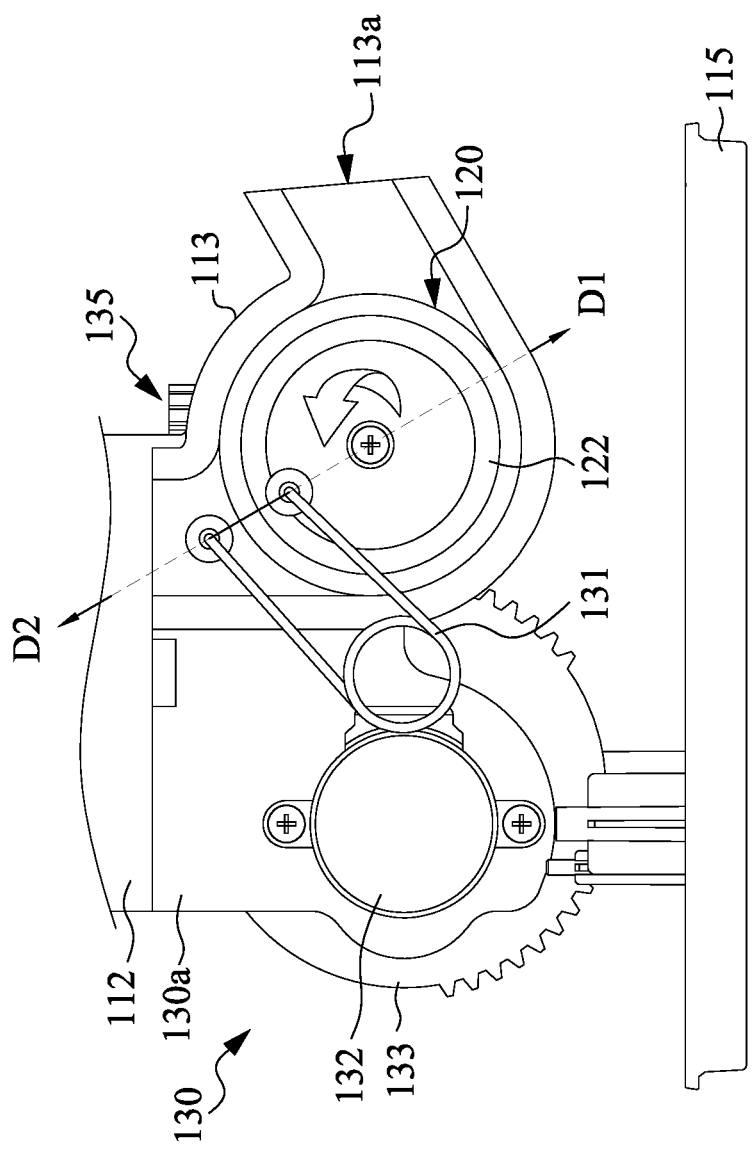
FIG. 5 is another partial side view of the components in FIG. 4.

Reference is made to FIG. 5. FIG. 5 is another partial side view of the components in FIG. 4. As shown in FIGS. 4 and 5, the driving module 130 further includes a position-returning member 131. The ejection structure 120 further includes a rotating disk 122. The rotating disk 122 is disposed at a side of the discharge channel 113, and the rotating disk 122 is coupled to the ejection blades 121 in the accommodating space S. The position-returning member 131 is coupled to the rotating disk 122 and the housing 110, and is configured to maintain the ejection structure 120 in a first rotational orientation D1 relative to the housing 110. For example, the rotational orientation of the ejection structure 120 relative to the housing 110 can be defined as the orientation of an axis of the rotating disk 122 toward the coupling point of the rotating disk 122 and the position-returning member 131. Therefore, the orientation of the rotating disk 122 in FIG. 4 is the aforementioned first rotational orientation D1. The driving module 130 is further configured to rotate the ejection structure 120 relative to the housing to exceed a second rotational orientation D2 (i.e., the orientation of the rotating disk 122 in FIG. 5) and then release the ejection structure 120.

As shown in FIGS. 2 to 4, the driving module 130 further includes a motor 132, a driving gear 133, and a driven gear 134. The motor 132 is fixed to the housing 110 and configured to rotate the driving gear 133. Specifically, the driving module 130 further includes an outer casing 130a, and the outer casing 130a is fixed below the hopper 112 and located between the hopper 112 and the base 115. The motor 132 is fixed to the outer casing 130a of the driving module 130. The driven gear 134 is disposed at another side of the discharge channel 113, and the driven gear 134 is coupled to the ejection blades 121 of the ejection structure 120 in the accommodating space S. In other words, the rotating disk 122 and the driven gear 134 are located at opposite sides of the discharge channel 113, and the ejection blades 121 are located in the discharge channel 113 and are coupled between the rotating disk 122 and the driven gear 134. The driving gear 133 has a first driving tooth portion 133a1 and a first toothless portion 133a2 arranged in a ring. The first driving tooth portion 133a1 is configured to mesh with the driven gear 134. When the motor 132 rotates the driven gear 134 via the driving gear 133, the ejection blades 121 and the rotating disk 122 will rotate together with the driven gear 134. In addition, the driven gear 134 also has a driven tooth portion 134a and a driven toothless portion 134b corresponding to the driving gear 133. The driven tooth portion 134a is configured to mesh with the first driving tooth portion 133a1, thereby reducing the number of teeth of each gear and avoiding the situation that each gear is prone to wear after long-term operation.

In detail, while the ejection structure 120 rotates from the first rotational orientation D1 to the second rotational orientation D2 relative to the housing 110, the first driving tooth portion 133a1 of the driving gear 133 will continue to mesh with the driven gear 134. When the ejection structure 120 continues to rotate beyond the second rotational orientation D2, the driven gear 134 will disengage the first driving tooth portion 133a1 of the driving gear 133 and roll to the first toothless portion 133a2 relative to the driving gear 133. At this time, the driven gear 134 can freely rotate relative to the driving gear 133 (i.e., the driven gear 134 is released by the driving gear 133). Therefore, the ejection structure 120 is quickly rotated and returned back to the first rotational orientation D1 by the position-returning member 131, so that the ejection blades 121 eject the feed F located in the accommodating space S away from the discharge port 113a.

As can be seen from the foregoing structural configuration, since the ejection structure 120 uses the ejection blades 121 to eject the feed F away from the discharge port 113a in a rotating manner, it can effectively avoid noise when ejecting the feed F.

In some embodiments, the ejection structure 120 rotates 180 degrees while rotating from the first rotational orientation D1 to the second rotational orientation D2, but the disclosure is not limited in this regard. In practical applications, the ejection structure 120 may rotate more than 180 degrees while rotating from the first rotational orientation D1 to the second rotational orientation D2.

In some embodiments, as shown in FIG. 3, a number of the driving tooth portion and a number of the toothless portion included by the driving gear 133 are both plural. The driving tooth portions and the toothless portions are alternately arranged. Hence, when the driving gear 133 driven by the motor 132 rotates once, the ejection structure 120 can eject the feed F for multiple times, so the burden of the motor 132 can be effectively reduced.

In the embodiment shown in FIGS. 4 and 5, the position-returning member 131 takes a torsion spring as an example, and its two ends are respectively coupled to the rotating disk 122 of the ejection structure 120 and the discharge channel 113. When the ejection structure 120 rotates from the first rotational orientation D1 to the second rotational orientation D2 relative to the discharge channel 113 of the housing 110, the two ends of the position-returning member 131 will approach to store elastic potential energy. When the ejection structure 120 continues to rotate beyond the second rotational orientation D2 to make the driving gear 133 release the driven gear 134, the position-returning member 131 will release the elastic potential energy to move its two ends away from each other, thereby causing the ejection structure 120 to quickly rotate and return back to the first rotational orientation D1.

Figure 6:
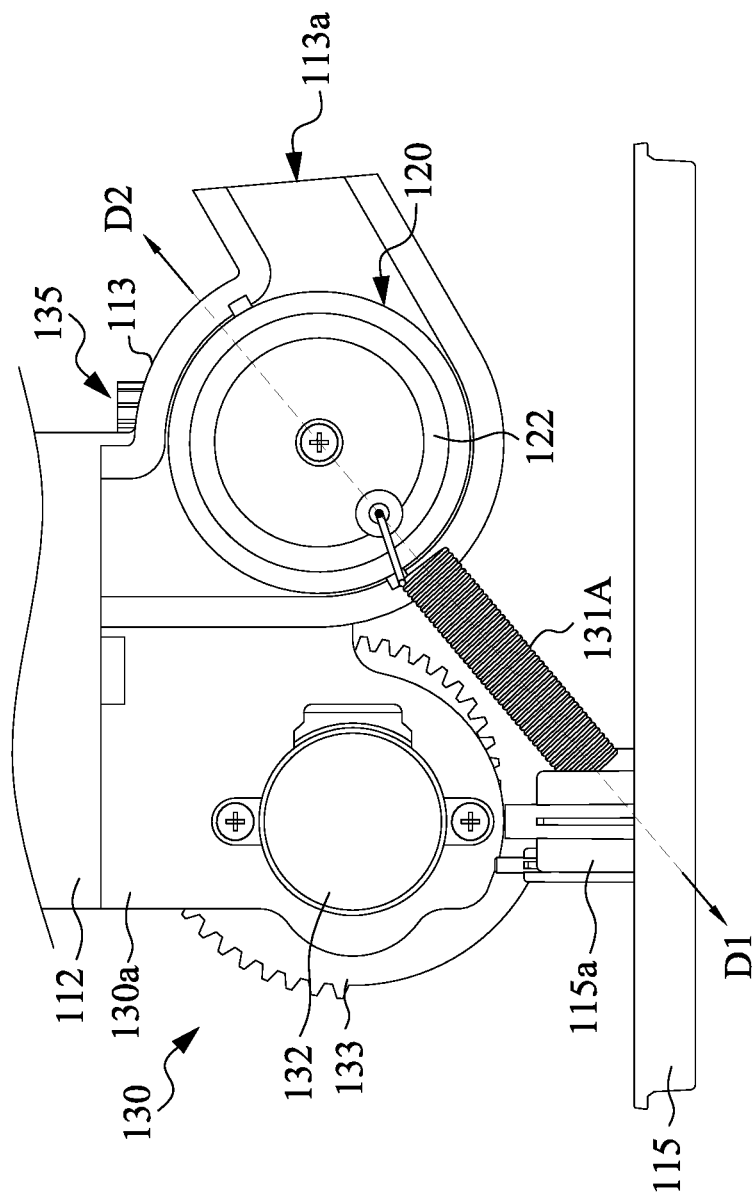
FIG. 6 is a partial side view of the components in FIG. 4 in another embodiment.

Reference is made to FIG. 6. FIG. 6 is a partial side view of the components in FIG. 4 in another embodiment. Compared with the embodiment shown in FIG. 4, the position-returning member 131A of this embodiment is replaced with a tension spring. The base 115 of the housing 110 includes a fixing portion 115a. An end of the tension spring is fixed to the fixing portion 115a, and another end of the tension spring is coupled to the rotating disk 122. When the ejection structure 120 rotates from the first rotational orientation D1 to the second rotational orientation D2 relative to the housing 110, the two ends of the position-returning member 131A will be stretched away to store elastic potential energy. When the ejection structure 120 continues to rotate beyond the second rotational orientation D2 to make the driving gear 133 release the driven gear 134, the position-returning member 131A will release the elastic potential energy to bring its two ends close, thereby causing the ejection structure 120 to quickly rotate and return back to the first rotational orientation D1.

Figure 7:
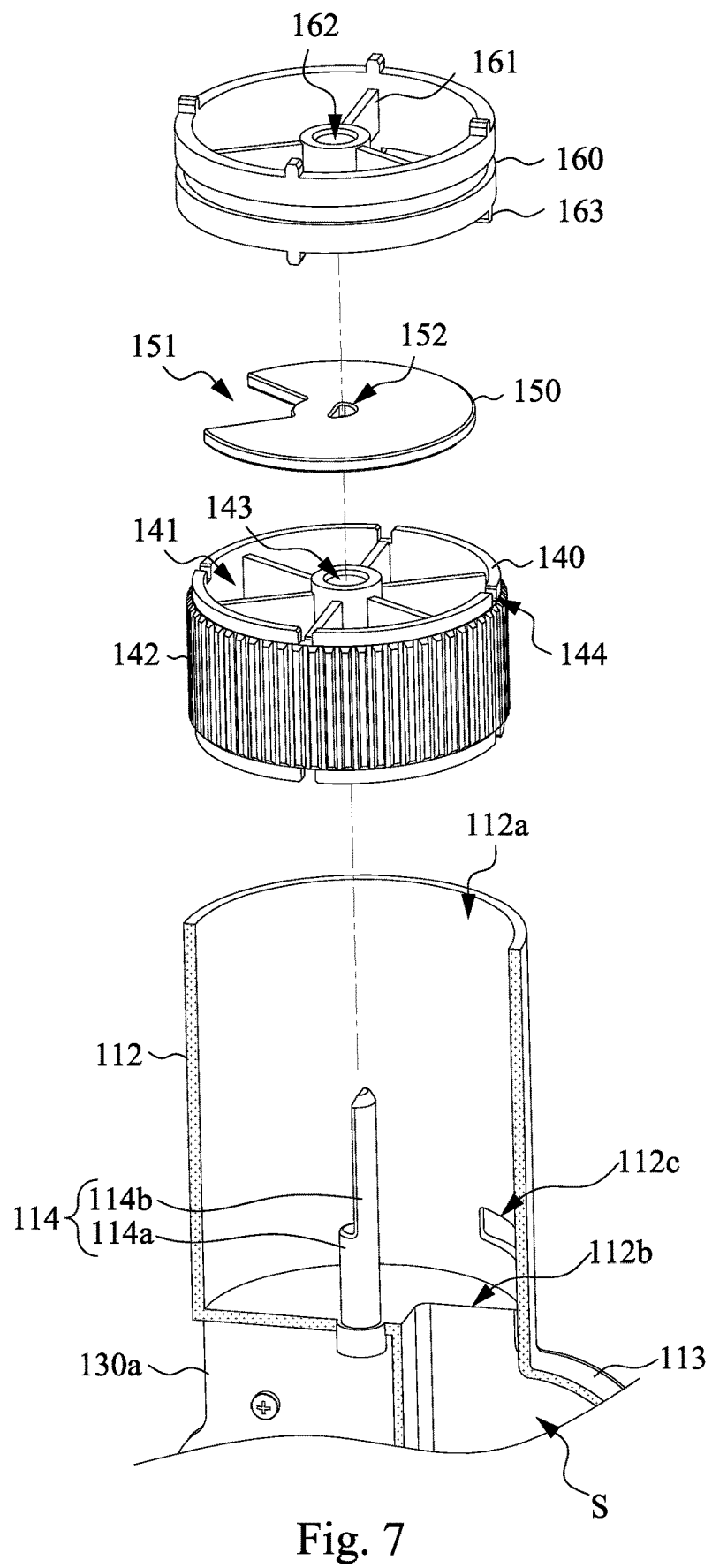
FIG. 7 is an exploded view showing a partial cross-section of the components in FIG. 4.

Reference is made to FIG. 7. FIG. 7 is an exploded view showing a partial cross-section of the components in FIG. 4. As shown in FIG. 7, the feeder 100 further includes a screening tray 140. The screening tray 140 is rotatably disposed in the hopper 112 and has a plurality of partition grooves 141 arranged in a ring. Each of the partition grooves 141 vertically runs through the screening tray 140. The partition grooves 141 are aligned with the communication port 112b in sequence as the screening tray 140 rotates. The driving module 130 is further configured to rotate the screening tray 140 (e.g., being coupled via a through hole 112c of the hopper 112). Hence, the feed F put in the hopper 112 can be grouped and screened into the partition grooves 141.

Reference is made to FIGS. 3 and 7. In the present embodiment, the driving module 130 further includes a transmission mechanism 135. The driving gear 133 rotates the screening tray 140 through the transmission mechanism 135. Specifically, the transmission mechanism 135 includes a transmission gear 135a. The driving gear 133 has a second driving tooth portion 133b1 and a second toothless portion 133b2 arranged in a ring. The second driving tooth portion 133b1 is configured to mesh with the transmission gear 135a. In addition, an outer edge of the screening tray 140 has a driven tooth portion 142 arranged in a ring. The transmission mechanism 135 further includes a transmission gear 135b. The transmission gear 135b meshes with the driven tooth portion 142. In the present embodiment, the transmission gear 135a and the transmission gear 135b are transmitted through a plurality of relay gears, but the disclosure is not limited in this regard. In practical applications, these relay gears can also be replaced by a belt.

In some embodiments, based on the different layouts of the driving module 130, the driving gear 133 can also directly mesh with the driven tooth portion 142 of the screening tray 140, and drive the rotating disk 122 of the ejection structure 120 through a component such as a relay gear or a belt.

Reference is made to FIGS. 2 and 7. In the present embodiment, the feeder 100 further includes a cover plate 150 and a stirring tray 160. The cover plate 150 covers the screening tray 140 in the hopper 112 and has a notch 151. The notch 151 is configured to expose one of the partition grooves 141. The stirring tray 160 is rotatably disposed in the hopper 112 and located over the cover plate 150. The housing 110 further includes a connection shaft 114. The connection shaft 114 is located in the hopper 112 and located at the bottom of the hopper 112. The screening tray 140 and the stirring tray 160 are rotatably sleeved onto the connection shaft 114. The cover plate 150 is engaged with the connection shaft 114. Hence, the screening tray 140 will cause its partition grooves 141 to be sequentially aligned and communicated with the notch 151 of the non-rotating cover plate 150 while rotating. In addition, the stirring tray 160 includes a plurality of stirring blades 161. After the feed F is put in the hopper 112, the stirring tray 160 which rotates can use the stirring blades 161 to stir the feed F, so it can effectively solve the problem that the feed F put in the hopper 112 is unevenly accumulated at one side of the hopper 112. Moreover, the amount of feed F drawn into the partition grooves 141 by the stirring blades 161 through the notch 151 of the cover plate 150 can be more consistent, which can effectively solve the problem of uneven amount of the feed F entering the discharge channel 113 each time.

In some embodiments, as shown in FIG. 7, the connection shaft 114 includes a circular shaft section 114a and a cut shaft section 114b connected to each other. The circular shaft section 114a is connected between the bottom of the hopper 112 and the cut shaft section 114b. The screening tray 140 is rotatably sleeved onto the circular shaft section 114a. The cover plate 150 is engaged with the cut shaft section 114b. The stirring tray 160 is rotatably sleeved onto the cut shaft section 114b. Specifically, the circular shaft section 114a passes through and is pivotally connected to a pivotal hole 143 of the screening tray 140. The cut shaft section 114b passes through and is pivotally connected to a pivotal hole 162 of the stirring tray 160. The cut shaft section 114b further passes through and is engaged with an engaging hole 152 of the cover plate 150.

As shown in FIG. 7, the screening tray 140 has a first engaging structure 144. The stirring tray 160 has a second engaging structure 163. The first engaging structure 144 and the second engaging structure 163 are engaged with each other and located outside an outer edge of the cover plate 150. Hence, when the screening tray 140 rotates, the stirring tray 160 can be driven to rotate at the same time. In some other embodiments, the driving module 130 can also be changed to rotate the stirring tray 160 and use the stirring tray 160 to drive the screening tray 140 to rotate. In the present embodiment, the first engaging structure 144 is a groove and the second engaging structure 163 is a bump, but the two structures can be interchanged in practice.

In some embodiments, while rotating one of the ejection structure 120 and the screening tray 140, the driving module 130 stops rotating another of the ejection structure 120 and the screening tray 140. For example, while the driving module 130 rotates the screening tray 140 to make the feed F enter the discharge channel 113 from one of the partition grooves 141, the driving module 130 stops rotating the ejection structure 120; and while the driving module 130 rotates the ejection structure 120 so that the ejection blades 121 eject the feed F located in the accommodating space S away from the discharge port 113a, the driving module 130 stops rotating the screening tray 140. Hence, this can effectively ensure that after the feed F that enters the accommodating space S from one partition groove 141 is ejected, the feed F in the next partition groove 141 enters the accommodating space S again, so that the amount of the feed F ejected each time can be more consistent.

In order to achieve the purpose of driving the ejection structure 120 and the screening tray 140 to rotate in sections, the relative positions of the first driving tooth portion 133a1, the first toothless portion 133a2, the second driving tooth portion 133b1, and the second toothless portion 133b2 on the driving gear 133 can be adjusted.

According to the foregoing recitations of the embodiments of the disclosure, it can be seen that in the feeder of the present disclosure, the ejection structure uses the ejection blade to eject the feed away from the discharge port in a rotating manner, so it can effectively avoid noise when ejecting the feed. In addition, the hopper of the feeder is further provided with a screening tray with a plurality of partition grooves, so the feed put in the hopper can be grouped and screened into the partition grooves. Furthermore, a rotatable stirring tray is further provided above the screening tray, so the problem of uneven accumulation of feed in the hopper at one side of the hopper can be effectively solved. Therefore, the amount of feed entering each compartment from the stirring tray through the notch of the cover plate can be more consistent, thereby effectively solving the problem of uneven feed entering the discharge channel each time.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A feeder, comprising:
 a housing comprising a discharge channel, the discharge channel having an accommodating space and a discharge port communicated with each other;
 an ejection structure comprising an ejection blade rotatably disposed in the accommodating space;
 a driving module configured to rotate the ejection structure, so that the ejection blade ejects the feed located in the accommodating space away from the discharge port,
 wherein the driving module comprising a position-returning member configured to maintain the ejection structure in a first rotational orientation relative to the housing, and the driving module is further configured to rotate the ejection structure relative to the housing to exceed a second rotational orientation and then release the ejection structures;
 a driven gear coupled to the ejection structure; and
 a driving gear having a first driving tooth portion and a first toothless portion arranged in a ring, the first driving tooth portion being configured to mesh with the driven gear.

2. The feeder of claim 1, wherein the driven gear has a driven tooth portion and a driven toothless portion arranged in a ring, and the driven tooth portion is configured to mesh with the first driving tooth portion.

3. The feeder of claim 1, wherein the driving gear further has a plurality of the first driving tooth portions and a plurality of the first toothless portions, and the first driving tooth portions and the first toothless portions are alternately arranged.

4. The feeder of claim 1, wherein the position-returning member is a torsion spring or a tension spring.

5. The feeder of claim 4, wherein two ends of the torsion spring are respectively coupled to the discharge channel and the ejection structure.

6. The feeder of claim 1, wherein the ejection structure rotates 180 degrees while rotating from the first rotational orientation to the second rotational orientation.

7. The feeder of claim 1, wherein the housing further comprises a hopper, a bottom of the hopper has a communication port connected to the discharge channel, and the feeder further comprises:
- a screening tray rotatably disposed in the hopper and having a plurality of partition grooves arranged in a ring, wherein the partition grooves are aligned with the communication port in sequence as the screening tray rotates,
- wherein the driving module is further configured to rotate the screening tray.

8. The feeder of claim 7, wherein the driving module comprises:
- a driving gear; and
- a transmission mechanism, the driving gear rotating the screening tray through the transmission mechanism.

9. The feeder of claim 8, wherein the transmission mechanism comprises a transmission gear, the driving gear has a second driving tooth portion and a second toothless portion arranged in a ring, and the second driving tooth portion is configured to mesh with the transmission gear.

10. The feeder of claim 8, wherein an outer edge of the screening tray has a driven tooth portion arranged in a ring, the transmission mechanism comprises a transmission gear, and the transmission gear meshes with the driven tooth portion.

11. The feeder of claim 7, further comprising:
- a cover plate covering the screening tray in the hopper and having a notch, the notch being configured to expose one of the partition grooves; and
- a stirring tray rotatably disposed in the hopper and located over the cover plate.

12. The feeder of claim 11, wherein the housing further comprises a connection shaft located in the hopper and located at the bottom of the hopper, the screening tray and the stirring tray are rotatably sleeved onto the connection shaft, and the cover plate is engaged with the connection shaft.

13. The feeder of claim 12, wherein the connection shaft comprises a circular shaft section and a cut shaft section connected to each other, the circular shaft section is connected between the bottom of the hopper and the cut shaft section, the screening tray is rotatably sleeved onto the circular shaft section, the cover plate is engaged with the cut shaft section, and the stirring tray is rotatably sleeved onto the cut shaft section.

14. The feeder of claim 11, wherein the screening tray has a first engaging structure, the stirring tray has a second engaging structure, and the first engaging structure and the second engaging structure are engaged with each other and located outside an outer edge of the cover plate.

15. The feeder of claim 7, wherein while rotating one of the ejection structure and the screening tray, the driving module stops rotating another of the ejection structure and the screening tray.

* * * * *